(12) United States Patent
Luo

(10) Patent No.: US 9,009,162 B1
(45) Date of Patent: Apr. 14, 2015

(54) METHOD FOR SEARCH DISAMBIGUATION USING HASHTAGS HAVING CONTEXT DATA ASSOCIATED THEREWITH

(71) Applicant: Ji Xian Luo, Ottawa (CA)

(72) Inventor: Ji Xian Luo, Ottawa (CA)

(73) Assignee: Ricky Huang, Ottawa (CA)

( * ) Notice: Subject to any disclaimer, the term of this patent is extended or adjusted under 35 U.S.C. 154(b) by 0 days.

(21) Appl. No.: 14/498,569

(22) Filed: Sep. 26, 2014

(51) Int. Cl.
*G06F 17/30* (2006.01)
*G06Q 50/00* (2012.01)

(52) U.S. Cl.
CPC .......... *G06Q 50/01* (2013.01); *G06F 17/30864* (2013.01); *G06F 17/30613* (2013.01)

(58) Field of Classification Search
CPC .............. G06Q 50/01; G06F 17/30613; G06F 17/30864
USPC ........................................... 707/740; 705/319
See application file for complete search history.

(56) References Cited

U.S. PATENT DOCUMENTS

| 7,644,052 | B1 * | 1/2010 | Chang et al. ................... 706/45 |
| 8,180,757 | B2 * | 5/2012 | Prager et al. ................. 707/707 |
| 2007/0043583 | A1 * | 2/2007 | Davulcu et al. .................... 705/1 |
| 2011/0288935 | A1 * | 11/2011 | Elvekrog et al. ........... 705/14.53 |
| 2012/0166931 | A1 * | 6/2012 | Alonso et al. ................. 715/234 |
| 2013/0304454 | A1 * | 11/2013 | Kimberly et al. ................. 704/9 |
| 2014/0059135 | A1 * | 2/2014 | Stan et al. ..................... 709/204 |

OTHER PUBLICATIONS

Mabbett, Triple tags on Twitter, 2008.*
Shulga, Who Owns #Hashtags?, May 12, 2013.*

* cited by examiner

*Primary Examiner* — William Spieler
(74) *Attorney, Agent, or Firm* — Shapiro Cohen LLP

(57) ABSTRACT

In an information searching method, information content records are provided in a computer network, each information content record including a tag indicator forming a subset less than a whole of a context hashtag record. When a search query including at least one search term is received from a user, a search is performed of an index of context hashtag records for the at least one search term. The index of context hashtag records is based on data other than only the subset less than the whole of the context hashtag record. Based on the searching, a list of context hashtag record matches is generated, and a search result is returned to the user. The search result includes a list of information content records, each information content record on the result list being associated with at least one context hashtag record on the list of context hashtag record matches.

13 Claims, 6 Drawing Sheets

METHOD FOR SEARCH DISAMBIGUATION USING HASHTAGS HAVING CONTEXT DATA ASSOCIATED THEREWITH

FIELD OF THE INVENTION

The invention relates generally to methods of indexing and searching information. More particularly, the invention relates to methods of search disambiguation using hashtags having context data associated therewith.

BACKGROUND OF THE INVENTION

The amount of information that is available on the Internet is massive, and is growing at an ever-increasing rate. In fact, by some estimates more than 670 Exabytes (670,000,000,000 Gigabytes) of accessible data was stored on the Internet at the end of 2013. This information is largely unstructured, being stored in the form of Web pages of the World Wide Web, blog posts, micro-blog posts, etc., and being created by different entities at different times and for different purposes. Unfortunately, the sheer volume of the information that is available makes it exceedingly difficult to locate specific information that is of interest to a particular user at a particular time. As such, the user must use a search engine to form a search query, review a list of search results that is returned in response to the search query, view the search results that appear to be relevant, and then review in greater detail those search results that are judged to be most highly relevant. Of course, at some point the user may decide to form a new search query if the previous search results do not appear to be particularly relevant, which leads to a time-consuming trial-and-error approach to information retrieval. It would be beneficial to the user if a search query returned a set of search results including only the information sources that are most relevant to the user.

Search engines do not perform full text searching of web pages and blogs etc. every time a search query is received from a user, since the massive amount of information that would need to be searched makes this approach unfeasible. Instead, search engines maintain an index of keywords and of the locations where those keywords can be found. Such indexes are created using "spiders" or "webcrawlers" to search the text of Web pages for the occurrences of the keywords, as well as following links to other Web pages that are referenced in the Web page, etc. Subsequent searching of the indexed information becomes very fast, because performing the search merely involves looking up the search terms that are provided in a search query, and then retrieving a list of all the information sources that contain the search terms. Unfortunately, since any given combination of search terms is likely to be found in a very large number of Web pages, even "narrow" search queries can result in a very long list of information sources.

As is apparent, in order to be of any practical use to the user the list of information sources must also be presented in an order that is based on some measure of relevance. Early attempts to improve the relevance ranking of search engine results utilized the metadata that is part of a Web page source file. Metadata includes descriptive terms that are provided by the creator of a Web page, but that are not displayed as part of the Web page. Unfortunately, metadata is susceptible to abuse (spamdexing) by those wishing to improve the ranking of their Web page by including keywords that are likely to be included in popular searches, although the keywords may have little or no relevance to the content of the Web page. Such techniques undermine attempts to provide the most relevant information sources to the user.

Modern search engines typically rely on parameters other than Web page metadata to assign relevance rankings to search engine results. For instance, the frequency and location of keywords within a Web page, how long the Web page has existed and the number of other Web pages that link to the Web page in question all factor into the relevance determination. This approach assigns higher relevance rankings to pages that are deemed more relevant or more popular, and is based on the assumption that if other users found a particular Web page to be relevant then it is more likely that future users will also find the same Web page to be relevant and/or authoritative. That being said, one problem with this approach is that individual search terms, in aggregate, do not imply a specific or intended context or meaning of the search query itself, and as a result the search query is inherently ambiguous. For instance, a search term such as "apple" may be intended to refer to the fruit in one search query but intended to refer to the computer and consumer electronics maker Apple® Inc. in another search query. Even a combination of search terms such as "rotten" and "apple" is ambiguous, since one search query may be intended to refer to the rotten fruit and another search query may be intended to refer to rotten customer service experiences at Apple® Inc. retail stores. Due to search "ambiguity," it is common for search engine results to include information sources that are relevant to each of the different interpretations of the meanings of the search terms. Even if information sources that are very relevant to the user are ranked relatively high in the search result list, it is generally the case that these results are intermixed with other information sources that are not relevant to the user. Search ambiguity therefore complicates the user's task of locating the most relevant information sources, increases the time and effort that must be expended to find the most relevant information sources, and generally frustrates the user's attempt to locate the information that he or she wishes to find.

A different strategy for improving the relevance of search results that are provided to a user is based on the use of hashtags. Hashtags are widely used in social media services such as Twitter®, allowing users to tag posts and thereby facilitate the grouping and retrieval of posts relating to a specific topic. The Twitter® hashtag appears in the body of a tagged post, as a word with no spaces and is preceded by the pound symbol, e.g. "#recycled." Once a hashtag has been created, it may then be used by anyone to tag any post, however community ire and usage policies tend to discourage the improper use of hashtags. Nevertheless, as evidenced by recent examples of hashtag campaigns that have gone awry, such as for instance McDonald's® Corporation's #McDStories hashtag campaign, the public nature of hashtags limits their usefulness for assigning relevance to the information that is tagged therewith. The #McDStories campaign was intended to encourage users to talk about their past good experiences at the company's restaurants. Although the company itself posted a series of positive messages including the hashtag #McDStories, other users tended to post negative messages and the company lost the ability to control the overall message of the campaign.

Hashtags are public and cannot be "retired" from public usage, meaning that hashtags can be used in theoretical perpetuity depending upon the longevity of the word or set of characters used. They also do not contain any set definitions, meaning that a single hashtag can be used for any number of purposes as espoused by those who make use of them. Thus the hashtag #apple can be used for posts about apples and for posts about Apple® Inc. and again for posts about Apple Records, etc. This inability to control the usage of a hashtag after it is created often limits the usefulness of public hashtags for the purpose of identifying the context or meaning of information that is stored on the Internet. Either a hashtag is used in vast majority for a single reference and becomes useful, or is it used over time for diverse references and becomes difficult to disambiguate. Presently, hashtags are better suited for facilitating short-term discussions in social media applications, in which posts all relate to a common general topic but may focus on different aspects of that topic or provide different opinions and views.

It would be advantageous to overcome at least some of the above-mentioned disadvantages of the prior art.

SUMMARY OF THE INVENTION

In accordance with an aspect of at least one embodiment of the invention, there is provided a method of generating a context hashtag, comprising: logging into a user account via a user system, the user account having associated therewith user profile information stored on a server; providing, via the user system, a tag name to be associated with the context hashtag; providing, via the user system, context information to be associated with the context hashtag, the context information being other than only the tag name; automatically associating creator-specific information with the context hashtag, the creator-specific information based on user identification data extracted from the account user profile information; and saving a context hashtag record to a database, the context hashtag record including at least the tag name, the context information and the creator specific information, wherein the creator-specific information identifies uniquely a single entity, and wherein the context hashtag is uniquely identifiable based on a combination of the creator-specific information and at least one of the tag name and the context information.

In accordance with an aspect of at least one embodiment of the invention, there is provided a method of associating a context hashtag with information content that is stored in an electronically searchable format in a computer network, the method comprising: displaying to a user, via an editor in execution on a user system, information content to be associated with a context hashtag; receiving an indication from the user, via the user system, the indication for selecting the context hashtag to be associated with the displayed information content, the selected context hashtag having associated therewith at least a tag name, context information that is other than only the tag name, and creator-specific information that identifies uniquely a single entity, and wherein the context hashtag is uniquely identifiable based on a combination of the creator-specific information and at least one of the tag name and the context information; in response to receiving the indication from the user, inserting computer readable instruction code into the displayed information content, the computer readable instruction code for generating a graphical representation of the context hashtag based on data retrieved from a context hashtag record stored in a database; and storing the selected information content, including the inserted computer readable instruction code, in the computer network.

In accordance with an aspect of at least one embodiment of the invention, there is provided a method of searching for information that is stored in an electronically searchable format in a computer network, the method comprising: providing in the computer network a plurality of information content records, each information content record comprising a tag indicator, the tag indicator forming a subset less than a whole of a context hashtag record, wherein the context hashtag record further comprises at least hashtag context data that is other than only a hashtag name, and hashtag creator-specific data that identifies uniquely a single entity; receiving a search query from a user system, the search query provided by a user via a user interface of the user system and including at least one search term; searching an index of context hashtag records for the at least one search term, the index of context hashtag records based on data other than only the subset less than the whole of the context hashtag record; generating a list of context hashtag record matches based on the searching, each context record hashtag on the generated list being uniquely identifiable based on the hashtag creator-specific data and at least one of the tag name and the hashtag context data; and returning a search result to the user, the search result comprising a list of information content records, each information content record on the result list being associated with at least one context hashtag record on the list of context hashtag record matches.

BRIEF DESCRIPTION OF THE DRAWINGS

The instant invention will now be described by way of example only, and with reference to the attached drawings, wherein similar reference numerals denote similar elements throughout the several views, and in which.

DETAILED DESCRIPTION OF EMBODIMENTS OF THE INVENTION

Figure 1:
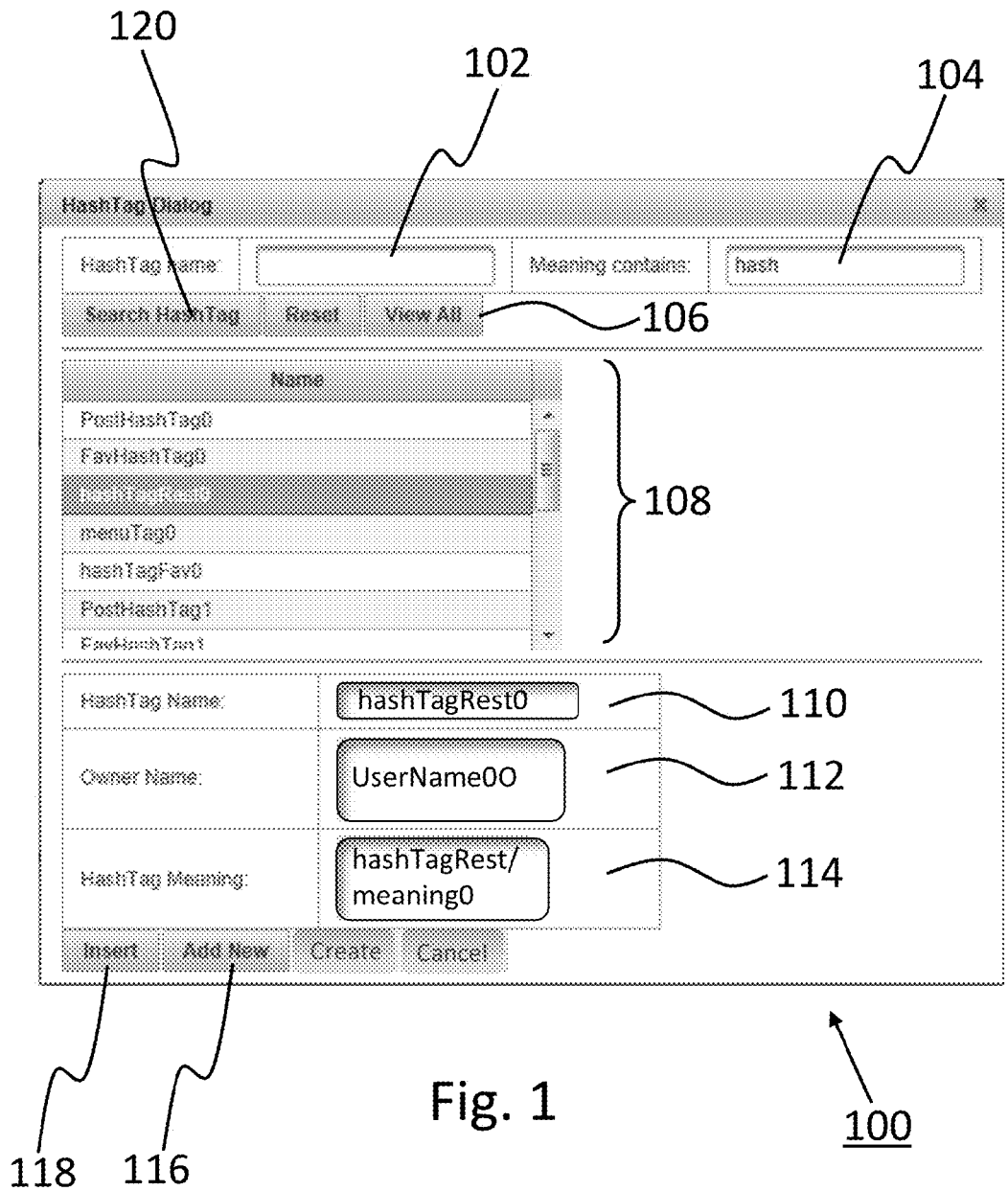
FIG. 1 is a simplified illustration of a context hashtag dialogue window supporting context hashtag creation and context hashtag searching functionality, according to an embodiment.

The following description is presented to enable a person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the scope of the invention. Thus, the present invention is not intended to be limited to the embodiments disclosed, but is to be accorded the widest scope consistent with the principles and features disclosed herein.

Definitions:

Throughout this description and in the appended claims, the following terms are to be accorded the following meanings:

Information content is a broad term encompassing identifiable quanta of data that are stored in electronic form within a computer network. Information content may relate to, without limit, web page data, blog post data, micro-blog post data, social media data, document data, database record data, etc. Information content may be stored in a wide area network (WAN) such as the Internet, a local area network (LAN), a private network, etc. Information content also refers to the displayed representations of such quanta of data, such as for instance a Web page or a blog post displayed via a browser that is in execution on a user system.

Context hashtag is a broad term describing an entity within a computer network, which is represented on a client side as an image or other identifier displayed within the information content itself, and which is represented on a server side as a database record and an index entry. The database record for a context hashtag includes at least tag name data, context information data other than only the tag name, and creator-specific information data that identifies uniquely a single entity, and may optionally and additionally include tag creation date data, tag reference count data, etc. A context hashtag may be associated with information content, and includes searchable data that describes the nature, context or meaning of the information content itself. Reference to a context hashtag displayed within information content is understood to mean an HTML image element or another similar element that serves as a visual cue to a user. Such an image element includes e.g. the tag name of the context hashtag and includes visible or invisible text relating to the tag owner and/or the context or meaning of the context hashtag. It is to be understood that the image element is generated based on context hashtag record data stored in a database on a server. The context hashtag record data optionally includes additional data that is not displayable via the image element.

Context information is a broad term and encompasses any descriptive data associated with a context hashtag, including human understandable and/or machine understandable data. In the case of human understandable data, the context information may include a single keyword, a series of keywords, a sentence, a paragraph, or combinations of these, etc. The context information describes the nature, context or meaning of the information content with which the context hashtag is associated. The context information does not necessarily describe the actual information content, but rather indicates the meaning or context within which the information content is to be interpreted.

Computer network is a broad term and encompasses a wide area network (WAN) such as the Internet, a local area network (LAN), a private network, etc. Computer networks include a plurality of interconnected client or user systems and/or servers. In some computer networks, servers are usable as client systems and vice versa. Some computer networks include more than one of a WAN, a LAN, a private network, etc. For instance, a client system may connect to a server that is on a WAN via a LAN or via a private network. Computer networks implicitly include mass storage devices for storing information content, databases and/or various indexes of the stored information content and context hashtags. Computer networks also implicitly include the necessary communication, routing and switching infrastructure to support transmission of data between the various client systems and servers, etc.

Entity is a broad term and encompasses any uniquely identifiable creator of a context hashtag. An entity is intended to include without limitation an individual, a group of individuals, a company, a corporation, an association, etc. Clearly, an entity may fall within more than one of these classifications, or within other classifications that are not explicitly mentioned. For instance, a sole proprietor may be considered to be both an individual and a company or corporation. A partnership may be considered to be both a group of individuals and a company or corporation, and a group of individuals may be considered to be also a corporation, a company or an association. In any case, in whatever way an entity is defined, that entity is uniquely identifiable and can be distinguished from every other entity. For instance, a user account is associated with the entity, and an entity identifier is assigned to the entity as part of the user profile data for the user account.

It is also to be understood that usage of the singular form of a term is not intended to exclude the plural form, unless it is explicitly stated to be the case or is implicitly understood based on context. For instance, reference to a server that performs a particular function is intended to include a single server performing that function as well as a plurality of servers performing that function. On the other hand, it is clear based on the context that since the creator-specific information identifies uniquely a single entity, the singular form "entity" is intended to exclude the plural form "entities".

Referring now to FIG. 1, a method of creating a "context hashtag" will now be discussed in accordance with an embodiment of the invention. In this specific and non-limiting example a user logs into a user account on a user system and launches an application, which results in the displaying of a hashtag dialog window 100 via a display device of the user system (the user system is not shown in FIG. 1). A representative hashtag dialogue window 100 is depicted in FIG. 1, but it is to be understood that any suitable interface that supports data input by the user may be used instead. The dialogue window 100 includes, by way of a specific and non-limiting example, search fields 102 and 104 for searching by hashtag name and hashtag meaning, respectively, as well as a row of search function virtual buttons 106. The dialogue window 100 further includes an area for displaying a list 108 of available hashtags matching specified search criteria, as well as tag information display fields 110, 112 and 114 for displaying the hashtag name, the hashtag owner name, and the hashtag meaning or context data, respectively, for a selected one of the hashtags in the list 108. Of course, optionally the dialogue window 100 includes additional search fields and/or additional tag information fields, and/or additional virtual buttons etc. It is to be understood that the hashtag dialogue window 100 is simplified for the purpose of providing an understanding of the invention.

Figure 2:
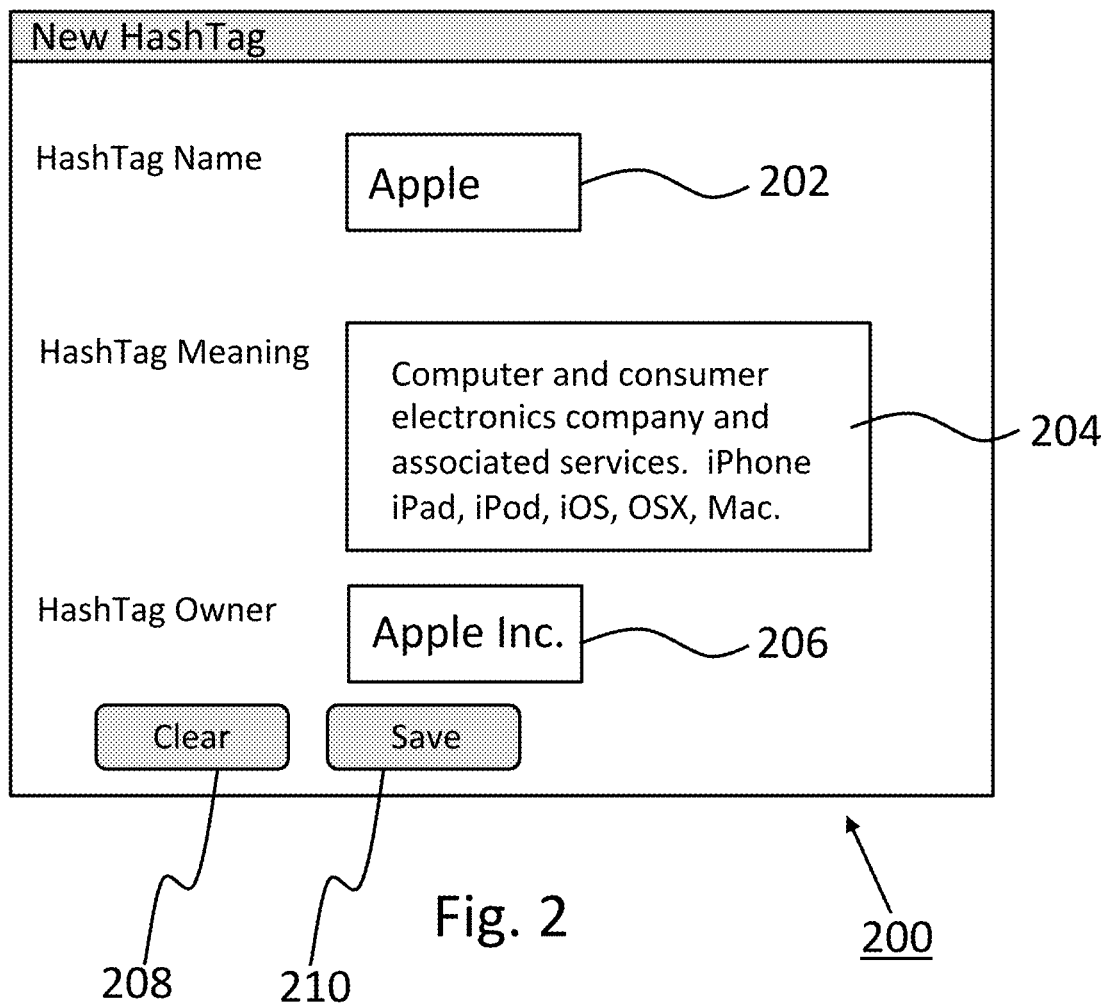
FIG. 2 is a simplified illustration of a pop-up window supporting entry of context hashtag data during creation of a context hashtag, according to an embodiment.

During the creation of a new context hashtag, the user selects the "Add New" virtual button 116 in order to access a pop-up window or expanded features of the dialogue window 100. Regardless of the specific implementation, the user is presented with fillable fields relating to the new context hashtag. Referring also to FIG. 2, in this simplified example the user is presented a pop-up window 200 with fillable fields 202 and 204 for specifying a tag name for the new context hashtag, as well as the context information for the new hashtag, respectively. In the present implementation a field 206 is automatically populated with the hashtag owner name, such as for instance based on user identification data that are extracted from user profile information stored in association with the user account. Optionally, in an alternative embodiment the owner name information is populated manually. The pop-up window in the present example further includes virtual buttons, such as for instance a "clear" virtual button 208 for clearing the text in fields 202-206, as well as a "save" virtual button 210 for causing the data defining the new hashtag to be stored in a database record.

Referring still to FIG. 2, the user provides a tag name via field 202. In particular, the tag name is an alphanumeric string with no spaces, and it is not required to be unique. Optionally, the tag name includes spaces and/or "special" characters. Unlike the public hashtags that are used in micro-blog services such as Twitter®, the tag name of a context hashtag does not preceded by the pound symbol ("#"). It is to be understood that plural context hashtags may have the same tag name. The user also provides context or meaning information to be associated with the context hashtag via field 204. The context information is optionally a single keyword, a series of words, a sentence, a paragraph, another hashtag, or a combination of these, etc. In the present example, the context information includes a brief sentence describing the nature of the company Apple Inc., followed by a list of popular Apple products. The user provides the context information in plain text form, thereby describing the information content with which the context hashtag is to be associated. In other implementations, the context data is provided in a form that is understandable by a computer. The hashtag owner name corresponds to the name of an individual, the name of a company or another type of organization, or it may be an alias. In the present example the Hashtag Owner name is automatically populated with "Apple Inc.," indicating that the tag was created and is owned by Apple Inc., using the user account that is registered to Apple Inc. Optionally, the pop-up window 200 presents other fields to the user, such as for instance hashtag creation date. If other fields are presented to the user during the creation of a content hashtag, then the user has the option of providing additional information via the other fields or leaving the other fields blank. In some implementations the other fields are automatically populated, and optionally the user either may or may not change the content of the other fields. Further optionally, the pop-up window 200 displays controls for setting features of the hashtag, such as for instance setting a private vs. public status, etc.

Figure 3:
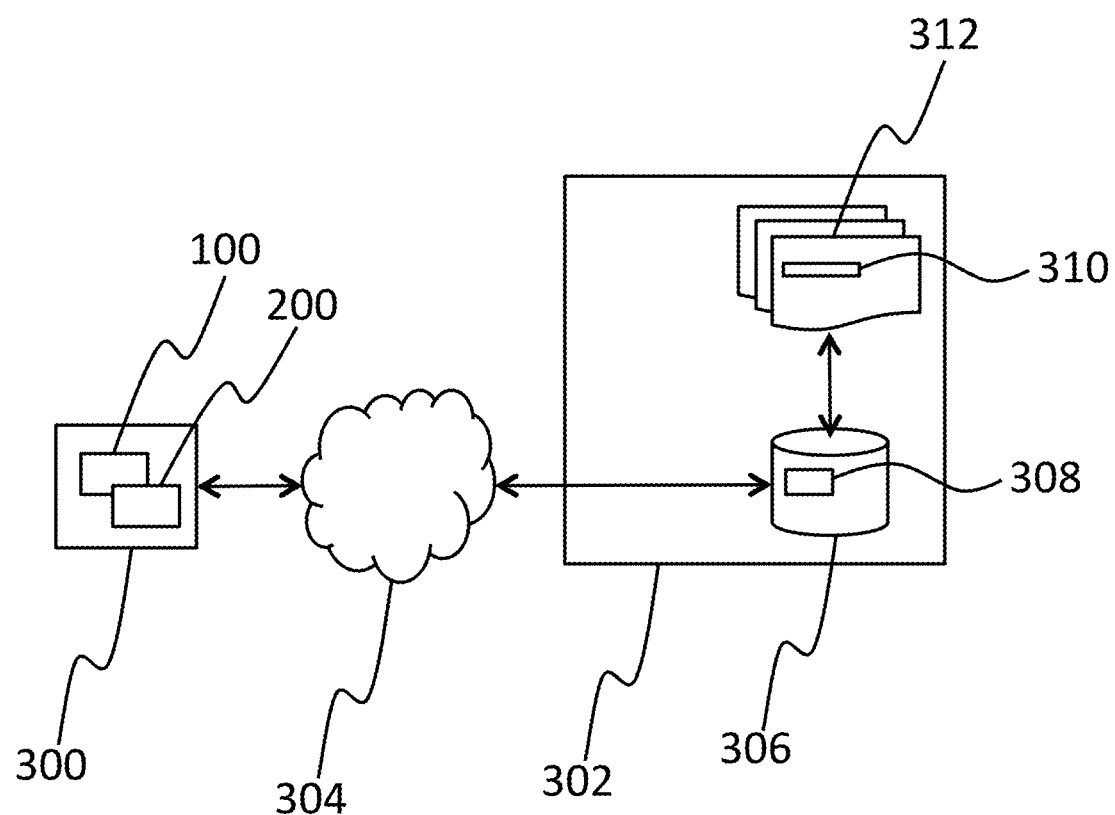
FIG. 3 is a simplified illustration of a computer system that may be used to implement embodiments of the present invention.

After the user has provided at least a tag name and context information via the corresponding input fields 202 and 204, respectively, the then user provides an indication via the virtual button 210 for saving a context hashtag record for the new context hashtag. Referring now also to FIG. 3, the context hashtag record data is transmitted from user system 300 to server 302, via a communication network 304, which is part of a computer network including the user system 300 and the server 302. The record data relating to the new context hashtag is stored in database 306 in the form of a context hashtag record 308, and is added as an entry 310 in index 312. Indexing of the hashtag record is similar to indexing of full text Web page data by search engines. In particular, the hashtag is indexed according to one or more of the following fields: i) tag name, ii) context data, and iii) hashtag owner etc. Once the context hashtag record 308 is stored in database 306 and the context hashtag is indexed via the entry 310 in index 312, the context hashtag becomes available for use in tagging information content and for use in retrieving the information content. For instance, the new hashtag is included in the list 108 that appears in hashtag dialogue window 100.

Figure 4A:
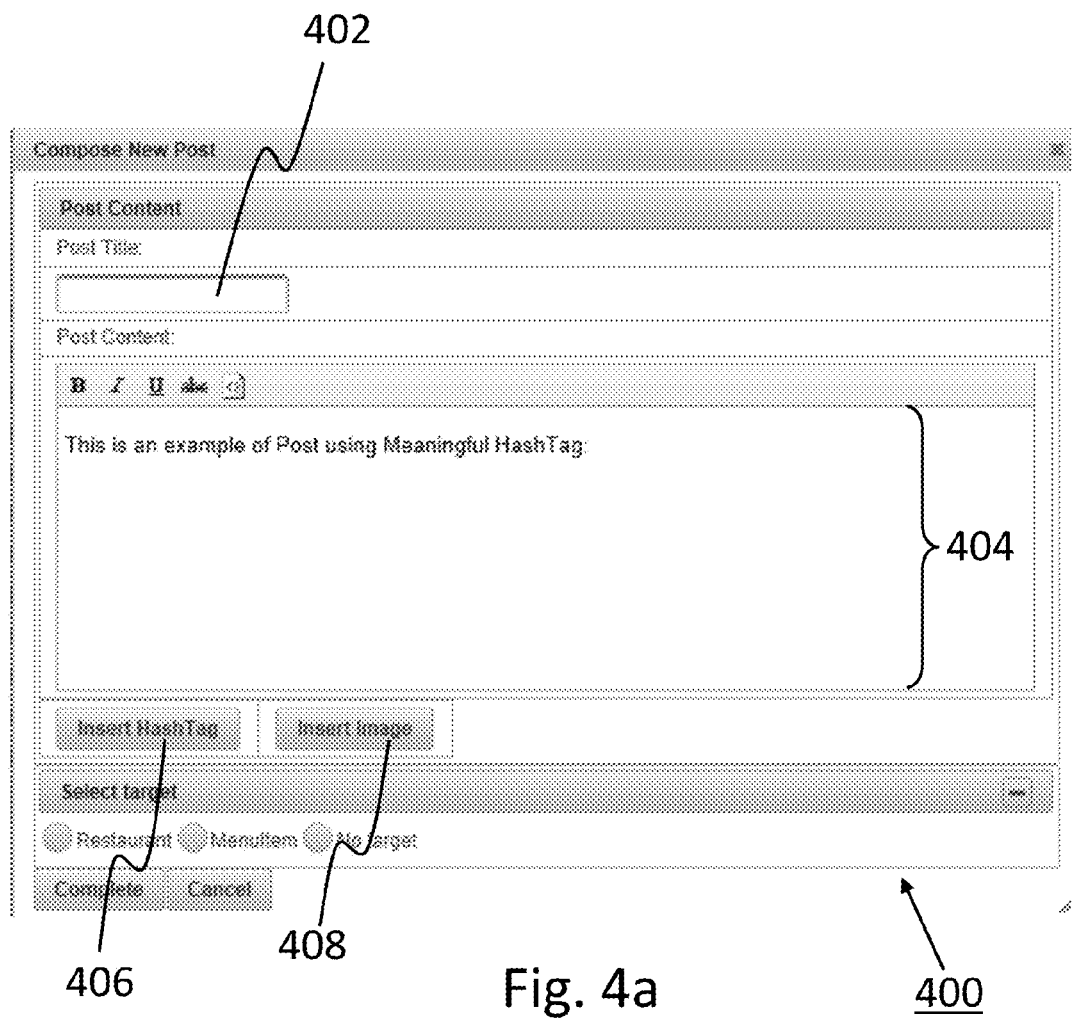
FIG. 4a is a simplified illustration of a blog editor showing a blog post prior to associating a context hashtag therewith.

A method of inserting a "context hashtag" into information content will now be discussed, in accordance with an embodiment of the invention. In this specific and non-limiting example, the context hashtag is inserted into a blog post 400. Alternatively, the context hashtag is inserted into a Web page or any other similar information content. With reference now to FIG. 4a, a user launches an editor on user system 300. The editor includes a fillable field 402 for providing a title for the blog post, and a fillable field 404 for providing the body text of the blog post. In addition, the editor includes virtual buttons 406 and 408 for inserting other content into the blog post. For instance, selecting virtual button 406 allows the user to insert a context hashtag, and selecting the virtual button 408 allows the user to insert an image.

Figure 4B:
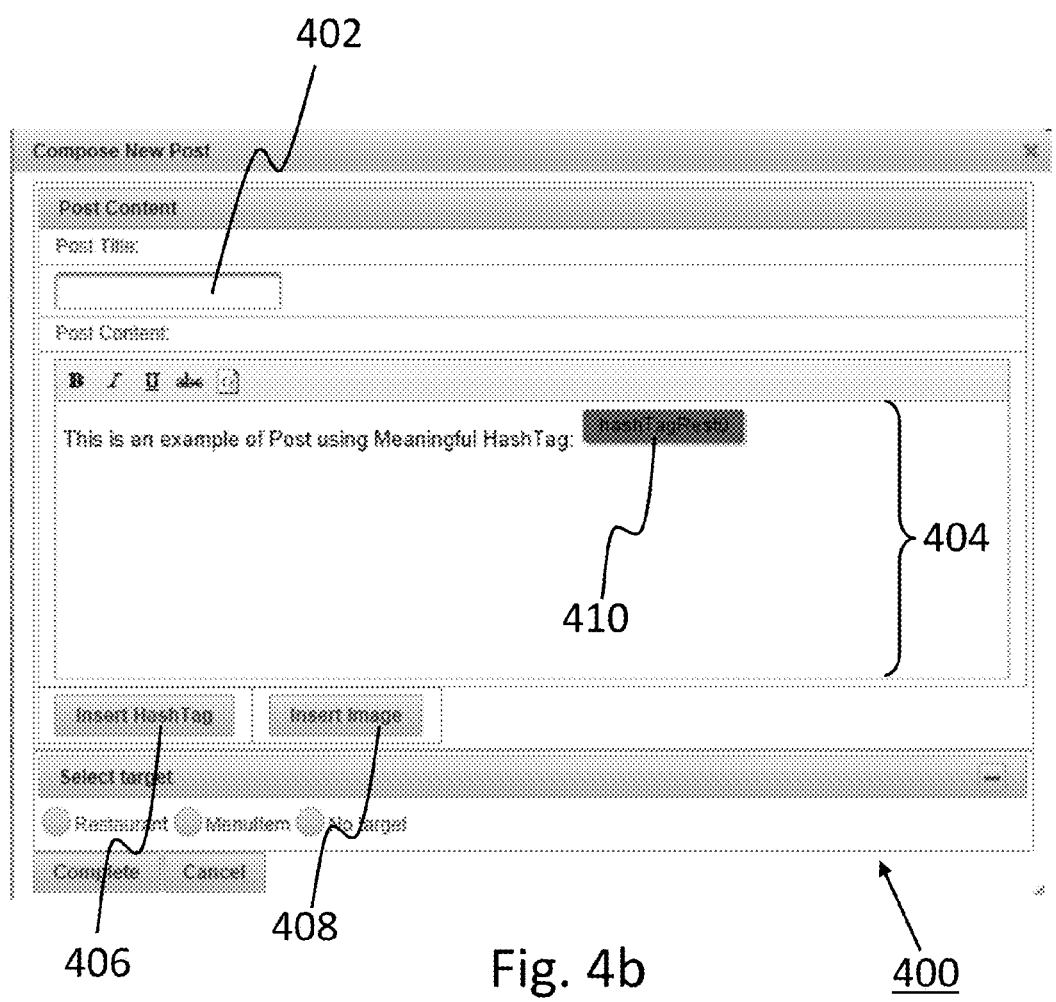
FIG. 4b is a simplified illustration of the blog editor of FIG. 4a showing the blog post subsequent to associating a context hashtag therewith.

Selection of the virtual button 406 causes the hashtag dialog window 100 to be displayed, in this specific and non-limiting implementation. The user then has the option to select one of the previously created hashtags appearing in the list 108, or to create a new hashtag as described in detail above. Once the context hashtag is selected in the list 108, the user selects button 118 to insert the selected context hashtag into the blog post. As is shown in FIG. 4b, an image element 410 is inserted into the blog post and includes a visual representation of the context hashtag. In the present implementation the visual representation of the context hashtag is an HTML image element inserted into the content, such as:

<img title="Owner: UserName0O; Meaning: hashTagRestMeaning0"
name="hashTagRest0"
src="http://localhost:8080/frontPost/
ImageServlet?word=hashTagRest0">

In practice, the domain name is any domain that hosts the application; it will be apparent that "localhost" is merely an example that is used for the purpose of describing the structure of the HTML element. In this specific implementation the source of the HTML image element 410 is a HTTP servlet request with a parameter of the tag name of the context hashtag, and the owner name and meaning or context data are in the title attribute. As such, a servlet on the server 302 dynamically creates an image element of the tag name of the context hashtag to be displayed in the information content. When a user interacts with the image element 410 that is displayed in the information content, a pop-up or content assistant displays additional information such as the context hashtag owner name and/or the context information associated with the context hashtag, and/or other information based on data that is stored in the associated context hashtag data record 308.

Subsequent to creating a context hashtag and inserting the context hashtag into information content, it is possible to search based on the context hashtag. For instance, the tag name itself may be indexed during the full-text indexing of web pages that is performed by search engines such as Google, Bing, etc. In this way, the tag name of the context hashtag becomes a searchable keyword that can be used to look up Web pages or blog posts using Google, Bing, etc.

Further, according to an embodiment of the invention a context hashtag index 310 is also maintained. The entries 310 in the context hashtag index link the location of information content to at least one context hashtag. In fact, a plurality of context hashtag indices may be maintained, based on for instance hashtag name, hashtag context (or meaning) information, hashtag creator-specific information, etc. The plurality of indices may be used separately or in combination during searching. For instance, a first index links hashtag names with keywords that are contained in the context information, and a second index links the hashtag names with the location of information content associated with context hashtags.

As described in the following sections, searching may be performed based on hashtag name and/or hashtag context information and/or hashtag creator-specific information and/or other features of the context hashtags. By way of a specific and non-limiting example, the hashtag dialogue window 100 that is shown in FIG. 1 includes search features, including fillable fields 102 and 104 that allow a user to enter search terms for hashtag name and hashtag meaning, respectively. Optionally, additional fillable fields are shown that allow a user to enter search terms for hashtag creator-specific information, e.g. owner name, etc. The search function virtual buttons 106 include a "search hashtag" button 120. Different results may be returned depending on the fields 102 and/or 104, or others, that are populated with search terms. In general, in this particular implementation, searching may be performed according to hashtag name or according to the meaning/context information, or both.

Search According to Hashtag Name.

A method of searching for information content that is stored in an electronically searchable format in a computer network will now be discussed, in accordance with an embodiment of the invention. In this specific and non-limiting example, the information content represents Web pages that are stored on the Internet as information content records. The Web page data include context hashtags, and each context hashtag has an associated context hashtag data record 308 stored in database 306. In a particular implementation, the Web page includes a tag indicator that is displayed in the form of an HTML image element 410 when the information content is displayed as a Web page via a browser. The image element 410 represents the tag name of the context hashtag and may provide a popup dialog box for displaying extra HashTag attributes, or optionally another indicator of the hashtag is displayed. Optionally, when a user interacts with the image element 410 additional HashTag content is displayed, which may include but is not limited to other menus and/or buttons and/or windows for displaying and managing referring HashTags, which may support functions including adding a HashTag to a favorite HashTag list for easy access and usage in the future.

Referring again to FIG. 1, a specific implementation is described based on the hashtag dialogue window 100. Via the hashtag dialogue window 100, a user types in the name of a context hashtag or selects one of the context hashtags displayed in list 108. Once the hashtag name is entered in the field 102, the user selects the search hashtag virtual button 120 and a not illustrated result list is displayed. For instance, searching for hashtag name "hashTagRest0" returns a list of the locations of all of the Web pages that have an entry 310 in index 312 linking the Web page to the context hashtag "hashTagRest0." Of course, optionally more than one hashtag name is entered via field 102, such that the search result includes a list of the locations of all of the Web pages that have entries in index 312 linking the Web page to each of the more than one context hashtags. It will be understood that context hashtags are not required to have a unique hashtag name, and as such searching by hashtag name may in some cases return a list including Web pages that are associated with different context hashtags having the same hashtag name. Subsequent filtering based on the hashtag creator-specific information associated with each of the context hashtags may be performed. For instance, searching based on the hashtag name "apple" may return results including Web pages that are associated with context hashtags owned by Apple Inc. as well as Web pages that are associated with context hashtag owned by the Ontario Apple Grower's Association. If the user is interested in the latest iPhone, then the user selects only the Web pages that are associated with the Apple Inc. hashtag.

Search According to Hashtag Context Information or Meaning.

Another method of searching for information content that is stored in an electronically searchable format in a computer network will now be discussed, in accordance with an embodiment of the invention. In this specific and non-limiting example, the information content represents Web pages that are stored on the Internet as information content records. The Web page data include context hashtags, and each context hashtag has an associated context hashtag data record 308 stored in database 306. In a particular implementation, the Web page data includes a tag indicator that is displayed in the form of an HTML image element 410 when the information content is displayed as a Web page via a browser. The image element 410 represents the tag name of the context hashtag, or optionally another indicator of the hashtag is displayed.

As described briefly above, when a context hashtag is created and a corresponding context hashtag record 308 is stored in database 306, the data that is contained in the hashtag data record 308 is indexed in the index 312. An entry 310 is created to link the context hashtag with the location of information content stored within the computer network, so as to facilitate later search and retrieval of the information content. In addition to indexing according to hashtag name, indexing also occurs based on the plain text context information that is provided via the fillable field 204 in the pop-up window 200 during hashtag creation. Subsequent searching may then be performed based on the indexed context information data of the context hashtags associated with Web page information content. For instance, an index is maintained for keywords, and links the keywords with context hashtag records that contain the keywords in the context information field thereof. By way of an example, a context hashtag record 308 for "Context HashTag 1," which includes "Keyword A" in the context information field, is stored in database 306. An index entry 310 is created linking "Keyword A" with "Context HashTag 1." Separately, when information content including "Context HashTag 1" is stored in the computer network, the information content is scanned to detect the context hashtag, and a resource identifier is assigned to the information content. The resource identifier is linked with an identifier of "Context HashTag 1" and an index of context hashtags is updated to include an entry linking the resource identifier with the identifier of "Context HashTag 1." Subsequently, when the user searches for "Keyword A" in the hashtag context (or meaning) field 104 of the hashtag dialogue window 100, it becomes a fast process to look up the occurrence of "Keyword A" and identify a list of context hashtags linked thereto, and to subsequently return a result list comprising the location of information content that is linked to each of the identified context hashtags that are linked to "Keyword A."

Additionally, searching may be performed based on the hashtag creator-specific information. For instance, a user may search for information content that is associated with any hashtags that were created by and are owned by a single entity. For instance, searching for Apple Inc. in a owner name search window will return a list of Web pages that are associated with a hashtag that contains Apple Inc. in the hashtag creator-specific information.

Figure 5:
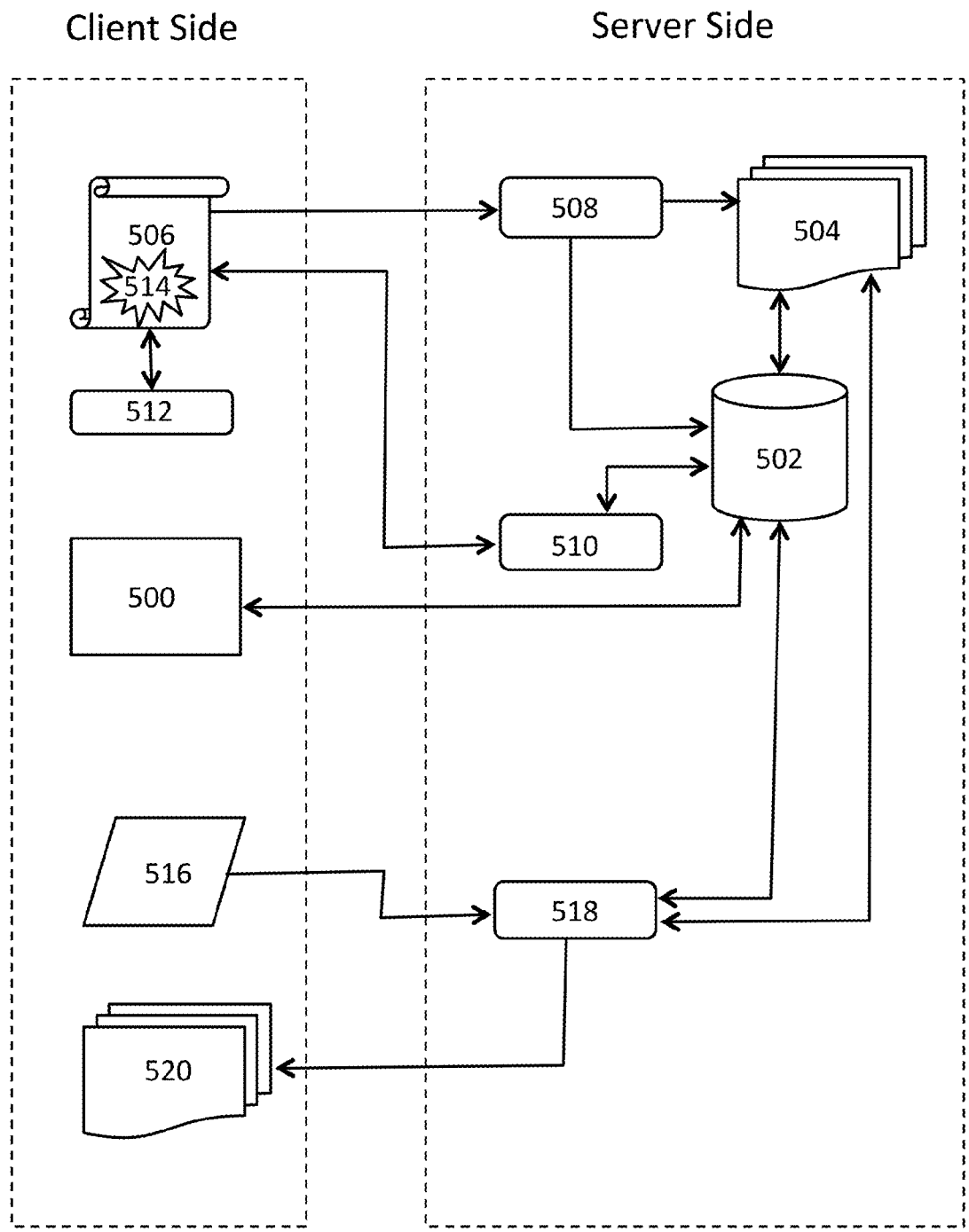
FIG. 5 is a simplified block diagram illustrating client side and server side functional blocks of a system according to an embodiment.

Referring now to FIG. 5, shown is a simplified block diagram showing the client side and user side functional blocks of a system according to an embodiment. The client side optionally is embodied on one user system, such as for instance a personal computer, or a plurality of user systems and/or servers. Similarly, the server side optionally is embodied on one server, or a plurality of servers that are in communication one with another via a communication network. A process 500 on the client side support functions including context hashtag creation and management. Management functions optionally support deleting or retiring the hashtag and/or modifying the hashtag. Data that are generated during hashtag creation and/or management functions are transmitted from the client side to the server side and the data are stored in database 502. Indexes 504 are maintained as changes are made to the contents of database 502. For instance, when a new context hashtag data record is saved to database 502, an entry is created in indexes 504 linking the context hashtag with keywords and/or with the locations of information content associated with that hashtag.

When a user on the client side creates or modifies a post 506, such as for instance by inserting a context hashtag, data relating to the post is provided to the server side. A scan engine 508 scans the content of the post 506 and detects the context hashtag. The indexes 504 are updated based on data from the scan engine 508 and data relating to the post 506 is stored in database 502. When post 506 is displayed via a user device on the client side, an HTTP request is sent to a servlet 510 on the server side, which generates an HTML image element including the tag name of the context hashtag associated with the post. A client side JavaScript 512 inserts the HTML image element 514, which includes the tag name of the context hashtag and is displayed within the post 506.

When a user on the user side provides search terms 516, such as for instance a tag name or keywords within the context information of a context hashtag, the search terms 516 are provided to search engine 518 on the server side. The index 504 is used to looks up the search terms etc. and the search engine 518 returns a set of results 520 to the user.

It will be appreciated that a context hashtag includes at least a hashtag name, context information and hashtag creator-specific information. The context information may be human understandable or machine understandable. Human understandable context information may be provided in the form of e.g., a single keyword, a plurality of keywords, a sentence or a paragraph, or a combination of these. A context hashtag optionally includes additional information, such as for instance hashtag creation date information, etc. Further optionally, the creator may set preferences that either allow or restrict or prohibit public use of the context hashtag. Optionally, a mechanism is provided for verifying the identity of the user either during account creation or subsequently thereto. In this way, context hashtags that are purported to be owned by a particular individual, association or company may be trusted. Searching based at least on context hashtag owner name, i.e. hashtag creator-specific information, allows a user to retrieve only the information content that is associated with a context tag created by a specified hashtag owner. Advantageously, an entity such as Apple Inc. may create a context hashtag with creator-specific information that is specific to Apple Inc., and deny public usage of the context hashtag. Subsequently, anyone searching based on that context hashtag is assured that all of the information content that is returned by the search is tagged by Apple Inc.

Of course, other implementations may be readily envisaged, using different combinations of dialogue windows and pop-up windows, or using different interfaces entirely to allow the user to provide, alter and/or delete text or other forms of data relating to the context hashtags.

While the above description constitutes a plurality of embodiments of the present invention, it will be appreciated that the present invention is susceptible to further modification and change without departing from the fair meaning of the accompanying claims.

What is claimed is:

1. A method of associating a context hashtag with information content that is stored in an electronically searchable format in a computer network, the method comprising:
   displaying to a user, via an editor in execution on a user system, information content to be associated with a context hashtag;
   receiving an indication from the user, via the user system, the indication for selecting the context hashtag to be associated with the displayed information content, the selected context hashtag having associated therewith at least a tag name, context information that is other than only the tag name, and creator-specific information that identifies uniquely a single entity, and wherein the context hashtag is uniquely identifiable based on a combination of the creator-specific information and at least one of the tag name and the context information;
   in response to receiving the indication from the user, inserting computer readable instruction code into the displayed information content, the computer readable instruction code for generating a graphical representation of the context hashtag based on data retrieved from a context hashtag record stored in a database; and
   storing the selected information content, including the inserted computer readable instruction code, in the computer network.

2. The method of claim 1, wherein the single entity is selected from the group consisting of: an individual, a group of individuals, a company, an institution and an association.

3. The method of claim 1, comprising generating an image element that is representative of the selected context hashtag, the image element displayed in the displayed information content or in a same or separate window.

4. The method of claim 3, wherein the image element includes a representation of the tag name, and comprising displaying a pop-up window containing the context information and the creator-specific information in response to an individual interacting with the image element.

5. The method of claim 1, wherein the indication is for selecting the context hashtag from a list of available context hashtags.

6. The method of claim 1, comprising generating a context hashtag using a user interface of the user system, and wherein the indication is for selecting the generated context hashtag.

7. The method of claim 1, wherein the information content relates to one of a World Wide Web page and a blog post.

8. The method of claim 1, wherein storing the selected information content in the computer network comprises:
   scanning the selected information content to detect the context hashtag;
   assigning to the selected information content a resource identifier;
   linking the resource identifier with an identifier of the context hashtag; and
   updating an index of context hashtags to include an entry linking the resource identifier with the identifier of the context hashtag.

9. A method of searching for information that is stored in an electronically searchable format in a computer network, the method comprising:
   providing in the computer network a plurality of information content records, each information content record comprising a tag indicator, the tag indicator forming a subset less than a whole of a context hashtag record, wherein the context hashtag record further comprises at least hashtag context data that is other than only a hashtag name, and hashtag creator-specific data that identifies uniquely a single entity;
   receiving a search query from a user system, the search query provided by a user via a user interface of the user system and including at least one search term;
   searching an index of context hashtag records for the at least one search term, the index of context hashtag records based on data other than only the subset less than the whole of the context hashtag record;
   generating a list of context hashtag record matches based on the searching, each context record hashtag on the generated list being uniquely identifiable based on the hashtag creator-specific data and at least one of the tag name and the hashtag context data; and
   returning a search result to the user, the search result comprising a list of information content records, each information content record on the result list being associated with at least one context hashtag record on the list of context hashtag record matches.

10. The method of claim 9, wherein the single entity is selected from the group consisting of: an individual, a group of individuals, a company, an institution and an association.

11. The method of claim 9, wherein each information content record relates to one of a World Wide Web page and a blog post.

12. The method of claim 11, wherein the index of context hashtags is indexed on the basis of the context information.

13. The method of claim 12, wherein the index of context hashtags is further indexed on the basis of the creator-specific information.

* * * * *